US011435876B1

(12) United States Patent
Kakati et al.

(10) Patent No.: US 11,435,876 B1
(45) Date of Patent: Sep. 6, 2022

(54) TECHNIQUES FOR SHARING ITEM INFORMATION FROM A USER INTERFACE

(71) Applicant: Amazon Technologies, Inc., Seattle, WA (US)

(72) Inventors: Mintoo Kakati, Pleasanton, CA (US); Michael Jeremy Temkin, San Francisco, CA (US); Johnson Cheng, San Francisco, CA (US); Yuri de Souza, San Francisco, CA (US); Daron Lin, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/117,859

(22) Filed: Dec. 10, 2020

Related U.S. Application Data

(60) Provisional application No. 63/105,178, filed on Oct. 23, 2020.

(51) Int. Cl.
| | |
|---|---|
| *G06F 3/048* | (2013.01) |
| *G06F 3/0482* | (2013.01) |
| *G06F 9/451* | (2018.01) |
| *G06Q 50/00* | (2012.01) |
| *G06Q 30/06* | (2012.01) |
| *G06Q 10/10* | (2012.01) |
| *H04M 1/72436* | (2021.01) |

(52) U.S. Cl.
CPC ............ *G06F 3/0482* (2013.01); *G06F 9/451* (2018.02); *G06Q 10/1093* (2013.01); *G06Q 30/0633* (2013.01); *G06Q 30/0641* (2013.01); *G06Q 50/01* (2013.01); *G06Q 30/0631* (2013.01); *H04M 1/72436* (2021.01)

(58) Field of Classification Search
CPC ... G06F 3/0482; G06F 9/451; G06Q 10/1093; G06Q 30/0633; G06Q 30/0641; G06Q 50/01
See application file for complete search history.

(56) References Cited

U.S. PATENT DOCUMENTS

| | | | | |
|---|---|---|---|---|
| 9,959,037 | B2 * | 5/2018 | Chaudhri | G06F 40/197 |
| 10,402,483 | B2 * | 9/2019 | Fan | G06F 40/143 |
| 10,437,779 | B2 * | 10/2019 | Fu | G06F 8/71 |
| 10,984,780 | B2 * | 4/2021 | Bellegarda | G10L 15/063 |
| 11,010,127 | B2 * | 5/2021 | Orr | G06F 40/30 |
| 11,025,565 | B2 * | 6/2021 | Sridhar | H04M 1/72436 |

(Continued)

*Primary Examiner* — David Phantana-angkool
(74) *Attorney, Agent, or Firm* — Kilpatrick Townsend & Stockton LLP

(57) ABSTRACT

Techniques are provided for sharing item information from a user interface. In some examples, a computing device may present a user interface for displaying an item. The computing device may also receive a first indication that a screen capture option has been selected. In response to receiving the first indication, an item-sharing menu may be presented. Data related to the item may be transmitted based at least in part on a selection made at the item-sharing menu. In some embodiments, receiving the indication that the screen capture option has been selected can cause the computing device to perform a variety of operations (e.g., adding an item to a wish list and/or play list, saving an album cover image, generating a social media post for sharing item data, and the like).

20 Claims, 10 Drawing Sheets

(56) References Cited

U.S. PATENT DOCUMENTS

| | | | | |
|---|---|---|---|---|
| 2009/0031227 A1* | 1/2009 | Chakrabarti | ............ | G06F 9/451 |
| | | | | 715/763 |
| 2014/0173460 A1* | 6/2014 | Kim | ...................... | G06F 3/0482 |
| | | | | 715/753 |
| 2019/0228041 A1* | 7/2019 | Kong | ....................... | G06F 9/451 |
| 2020/0099638 A1* | 3/2020 | Andreev | ................. | H04L 51/02 |

* cited by examiner

TECHNIQUES FOR SHARING ITEM INFORMATION FROM A USER INTERFACE

CROSS-REFERENCE TO RELATED APPLICATIONS

This application claims the benefit of and priority to U.S. Provisional Application No. 63/105,178, filed Oct. 23, 2020, and entitled, "TECHNIQUES FOR SHARING ITEM INFORMATION FROM A USER INTERFACE," the content of which is herein incorporated by reference in its entirety.

BACKGROUND

Mobile devices are used by millions to consume digital content. It is common for a user to want to transmit (e.g., share) some of this content to other devices. The share action in various applications (e.g., the "Now Playing" screen of a music application) is often buried inside the overflow menu. This limits the discoverability of the share action for users who want to share data (e.g., the track they are currently playing). In some instances, users may wish to share a track when the easiest thing to do is merely share a screenshot. Techniques for sharing data (and/or performing various operations) can be improved.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein may decrease latency experienced by a user when the user desires a number of operations to be executed at their user device. The user may initiate a screen capture option via an application of the user device (e.g., a web browser, a shopping application, a streaming application, etc.). The screen capture option may be used to trigger performance of a variety of operations. The particular operations executed may depend on the item and/or the application being used. By way of example, one application may perform a first set of operations and/or provide a first set of user interfaces when a screen capture option is selected, while another application may perform a second set of operations and/or provide a second set of user interfaces when a screen capture option is selected. In some embodiments, the second set of operations/interfaces differ from the first set of operations/interfaces. As another example, a screen capture option initiated at a user interface depicting an item of one type (e.g., a digital item) may cause different operations to be performed than if the same screen capture option was initiated at a user interface depicting an item of a different type (e.g., a physical item).

Figure 3:
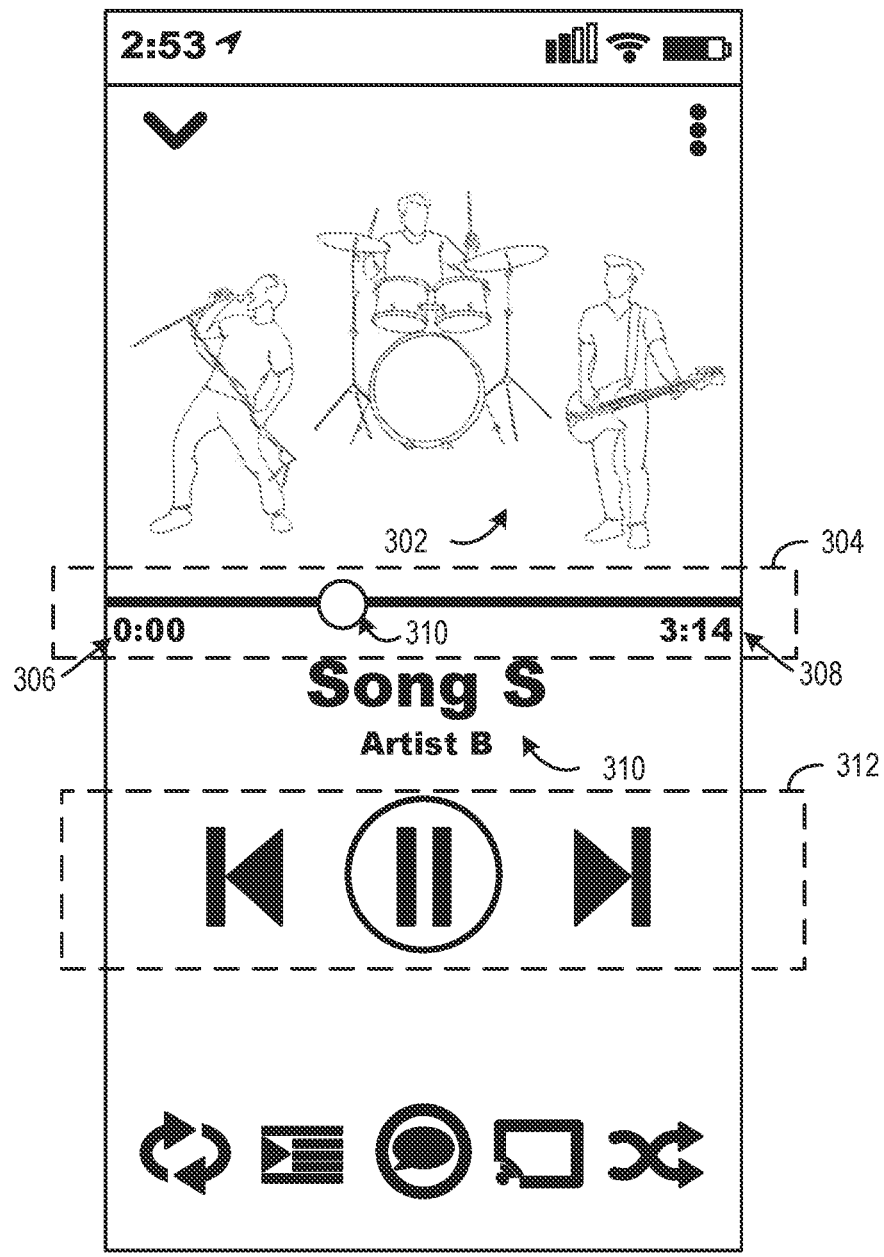
FIG. 3 is an example Now Playing screen, in accordance with at least one embodiment.

By way of example, when a user takes a screenshot (e.g., capture an image using a device-specific combination of inputs) in a mobile app (e.g. music, video, shopping, reading, etc.), in addition to capturing the screenshot, they may also be provided an option to transmit (e.g., share) the content (e.g., an audio track, a movie, an item available to order, or an e-book to read) with other electronic devices (e.g., of their friends or other contacts) and also unlock recommendations to share related content. To reduce the friction of sharing, a transient banner can be added whenever customers take a screenshot of the Now Playing Screen, enabling them to share the track just by tapping on the banner. An example Now Playing screen is depicted at FIG. 3. A Now Playing screen can be formatted in any suitable manner and include information regarding an item that is currently being played at the device. In some embodiments, the Now Playing screen focuses on (is dedicated to) item information of the particular item being played (or currently paused) rather than information pertaining to other items. The concepts discussed herein can be implemented outside of music application as well. For example, in a shopping application, a link to an item detail page displaying could be shared based on a user selecting the screen capture option. An item detail page may be a webpage that focuses on the item or is dedicated to the item and the metadata associated with the item, rather than a page that features metadata of many items such as a webpage that lists search results. In some embodiments, the screen capture image could be included with the message that shares the link or other information about the song or item. The share option may also be presented in different locations within the application, not just the Now Playing Screen, e.g., on the main page, in an artist page, in a playlist page, etc. The information that is shared may be based on the context (e.g., which page is being displayed and/or what the user is doing on that page) or may be user configurable at the time of capture or in settings.

Techniques described herein may decrease latency experienced by a user when he wants to share information about an item with another person. The techniques described herein reduce this delay by using the screen capture itself as an indication of intent (e.g., that the user desired to) share some aspect of data associated with the item being displayed when the screen capture occurred. In some embodiments, the user's intent to share the item may be verified via an additional user input (e.g., tapping on the transient banner described above).

In some embodiments, the item-sharing menu can be requested and provided by the operating system of the device. In other embodiments, the application itself can provide a customized item-sharing menu that can order the item-sharing options of the menu based on historical data associated with the user (or other streaming users). By way of example, if the user most often shares information via text message instead of posting to their social media page, an option for sharing item information via text message may be organized in a higher and/or more prominent position in the item-sharing menu than an option for sharing the item information via their social media page.

Although examples may be provided in the context of item information sharing, it should be appreciated that the screen capture option can be used to initiate the execution of any suitable operations. The particular operations may depend, in some cases, on the content being displayed at the user device when the screen capture option is initiated and/or context and/or application being utilized at the time the screen capture option is initiated. By way of example, a screen capture initiated while a user is viewing an item detail page for an item offered for consumption at an online retailer website may cause an item-sharing menu to be displayed. In other embodiments, the screen capture initiated in this context could add the item to a default wish list, add the item to a shopping cart, save an image of the item in local memory, and the like. In some embodiments, if an image is saved to local memory, the image may be one associated with the item instead of the content currently being displayed at the user device when the screen capture was initiated. For example, a screen capture initiated via an application (e.g., a web browser, a music application for streaming and/or listening to music, etc.) while an audio track is currently being streamed and/or played may obtain an image associated with the album to which the track corresponds and store the image in local memory. The image of the album may be stored regardless of the actual content being displayed at the user interface when the screen capture occurred.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 1:
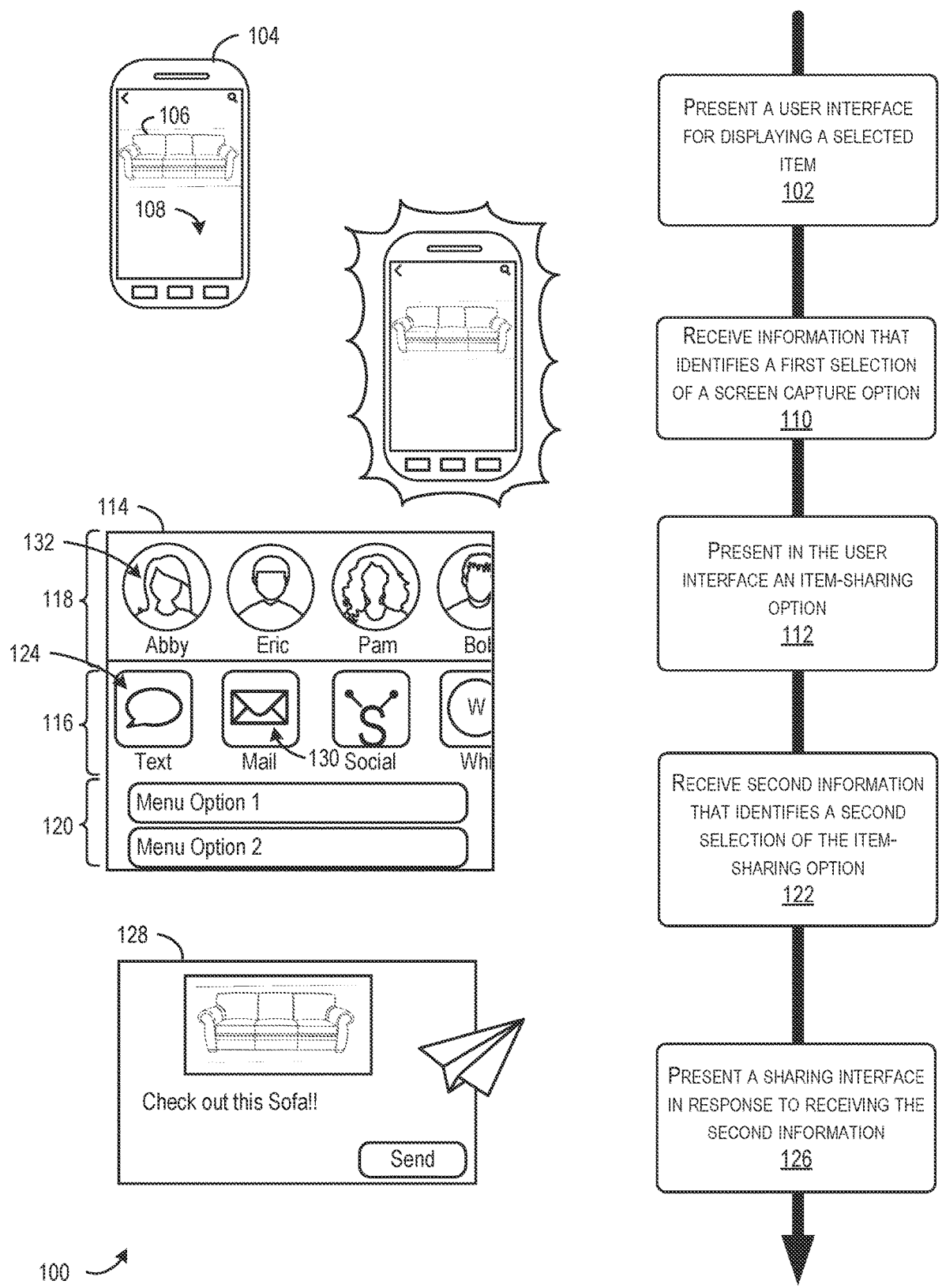
FIG. 1 is an example flow for sharing data from a user interface, in accordance with at least one embodiment.

Moving on to FIG. 1, which illustrates an example flow 100 for sharing data from a user interface, in accordance with at least one embodiment. The flow 100 may begin at 102, where a user interface for displaying a selected item may be presented. By way of example, user device 104 may be utilized to present item 106 via user interface 108. In some embodiments, the user interface 108 is an item detail page hosted by an online retailer. The item detail page may be in any suitable format and may be specific to the item. In some embodiments, the item detail page may provide any suitable information about the item such as an item description, a price, a manufacturer, item dimensions, reviews from purchasers of the item, to name a few.

At 110, the application may receive information that identifies a first selection of a screen capture option. In some embodiments, the screen capture option may be associated with a particular (e.g., device-specific, manufacturer-specific, etc.) combination of user inputs. As a non-limiting example, the user may press multiple physical input devices (e.g., buttons of a mobile phone) to indicate selection of the screen capture option. In some embodiments, the particular combination of inputs associated with the screen capture option may be user-defined.

At 112, the user may be presented, in the user interface, an item-sharing option. As a non-limiting example, upon identifying the screen capture option was selected, the application providing the user interface may request from the operating system of the user device 104, an item-sharing menu. In some embodiments, the application itself may provide the item-sharing menu independently, without requesting any information from the operating system. User interface 114 is an example of one way in which the application can present the user with an item-sharing option. In some embodiments, the user interface 114 may be provided by the operating system of the user device 104. In user interface 114, a number of item-sharing options 116 may be provided. The item-sharing options 116 may be ordered according to a predefined scheme. In some embodiments, a set of recently-utilized contacts 118 may be presented, although in other embodiments, the set may include most-often utilized contacts in addition to or instead of recently-utilized contacts. In some embodiments, any suitable number of additional options 120 may be presented. For example, additional options 120 may include options to store an image associated with the item to local memory, add the item to a wish list, add the item to a shopping cart, or the like. In some embodiments, the user interface 114 may be presented atop and/or adjacent to the user interface 108, although in other embodiments, the user interface 114 may replace the user interface 108 as the focus of the display of the user device 104.

At 122, second information may be received. The second information may identify and/or indicate that a second selection has occurred (e.g., selection of one of the item-sharing options 116). By way of example, the user may select item-sharing option 124, associated with text messaging.

At 126, sharing interface 128 (e.g., a text messaging interface) may be presented at the user device 104 in response to receiving the second information at 122. The particular data and/or interface presented may depend on particular user input received at the user interface 114. For example, the sharing interface 128 may be presented at user device 104 in response to receiving user input indicating a selection of the item-sharing option 124, while a different interface (e.g., an email message interface, not depicted) may be presented were the user input to indicate the user selected item-sharing option 130. In some embodiments, each of the set of recently-utilized contacts 118 may individually be associated with a particular item-sharing option. By way of example, if contact option 132 was selected, the selection may correspond to not only a particular contact (e.g., "Abby") but also a particular type of item-sharing (e.g., text messaging). Thus, it should be appreciated that selecting one of the set of recently-utilized contacts 118 (which in some embodiments could additionally or alternatively include most-utilized contacts) may also be considered a selection of an item-sharing options when the contact selected is also associated with a particular item-sharing option.

It should be appreciated that the style and content of the various user interfaces depicted in FIG. 1 are utilized for illustration purposes only and are not intended to limit this disclosure. The particular interface(s) used may differ in appearance and content as would be apparent to one skilled in the art of providing user interfaces for obtaining user input. Additionally, although the example of claim 1 is provided in the context of the item 106 being a physical item (e.g., a couch), in some embodiments, the item 106 may be an intangible item including, but not limited to digitally-provided music, video(s), television show(s), or the like. Although the item 106 is depicted as being presented at an item detail page (e.g., a webpage provided by an online retailer and associated with item 106), in other embodiments, the item may be displayed via any suitable interface (e.g., a "Now Playing" screen when the item is a music track, a video, etc.). The particular actions performed in response to receiving information that identifies a first selection of the screen capture option may vary based at least in part on the attributes of the item and/or the user interface currently being displayed when the screen capture option is selected.

Figure 2:
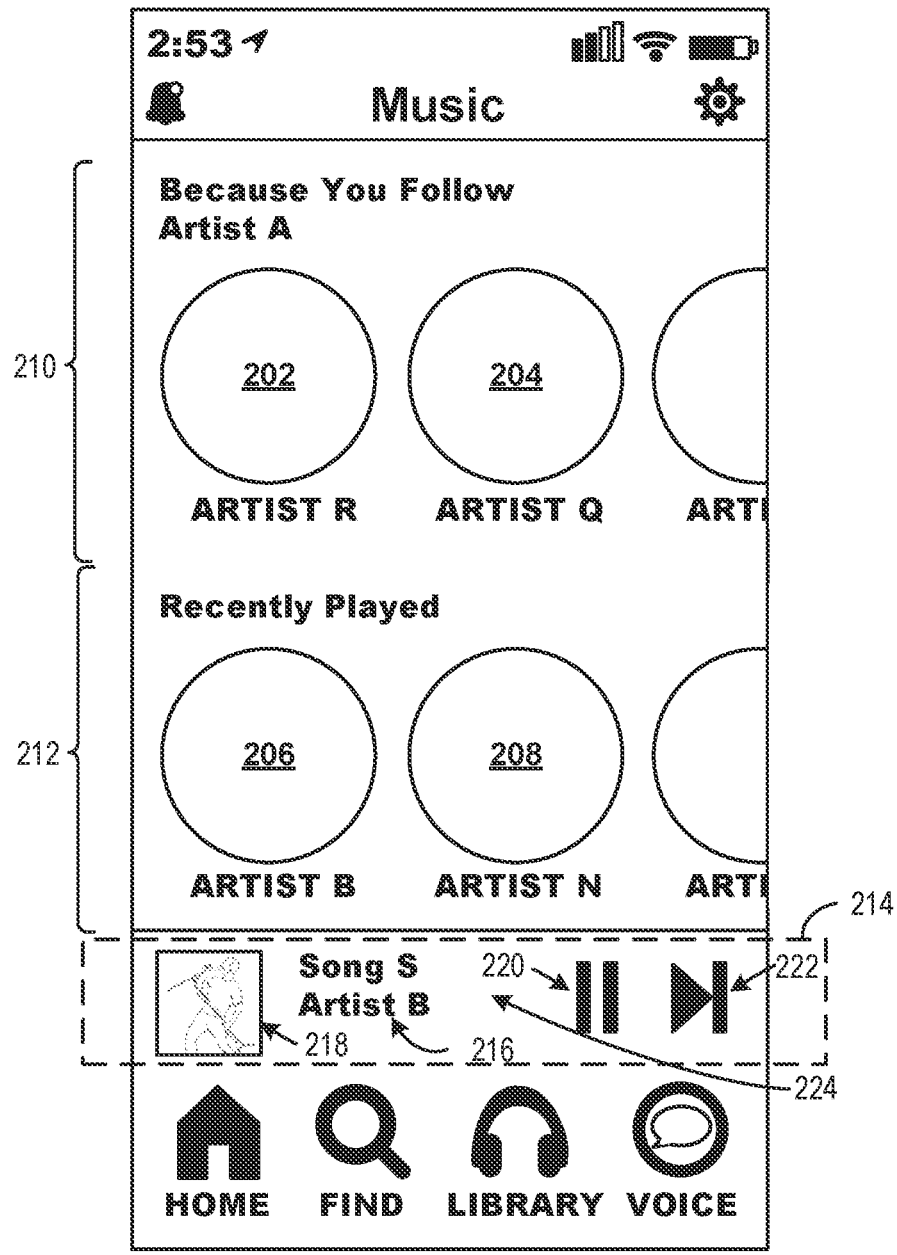
FIG. 2 is an example user interface from which a song may be played, in accordance with at least one embodiment.

FIG. 2 is an example user interface 200 from which a song may be played, in accordance with at least one embodiment. User interface 200 may include any suitable user interface elements that correspond to any suitable option. These user interface elements may be formatted according to any suitable predefined scheme. By way of example, user interface 200 may include user interface elements 202, 204, 206, and 208. Each of the user interface elements 202-208 may be presented as an image associated with a particular musical track associated with a particular artist. In some embodiments, selection of any one of the user interface elements 202-208 may cause the application by which the user interface 200 is presented to play (e.g., stream) the musical track that corresponds to the selected user interface element.

As a non-limiting example, the user interface 200 includes an area 210 for a first set of recommended musical tracks that have been identified based at least in part on the knowledge that the user has followed (or otherwise indicated interest in) a particular artist (e.g., artist A). In some embodiments, area 212 may additionally or alternatively be displayed to include one or more musical tracks that have been recently played by the user. In some embodiments, these areas may be differently arranged than they are depicted in FIG. 2.

In some embodiments, the user may select a particular track (e.g., a song associated with Artist B) based at least in part on selecting user interface element 206. The application, upon receiving an indication that the user interface element 206 was selected, may execute any suitable operations for causing the musical track to be played via a speaker of the device. In some embodiments, if the musical track is stored locally at the user device, the selection may cause the application to play the musical track from local data. If the musical track is stored at a remote location (e.g., at a service provider computer that hosts a music streaming service), the application may submit a request to a remote computing device (e.g., a service provider computer) requesting playback of the musical track. In some embodiments, the remote computing device may, among other things, verify digital rights associated with the user before streaming or otherwise providing the musical track to the user device for playback.

In some embodiments, the application may present user interface 214 atop, within, and/or adjacent to the user interface 200. The user interface 214 may indicate the song and/or the artist at 216, an image 218 associated with the song and/or the album of which the song belongs, and/or one or more navigational interface elements such as pause option 216 and/or forward option 222. In some embodiments, the content of user interface 214 may depend on the particular action currently being performed. By way of example, the pause option 216 may be presented upon selection of the user interface element 206 and upon commencing playback of the corresponding musical track. However, if the user selects pause option 216, the pause option 216 may be replaced with a different user interface element (e.g., a play option, not depicted). In some embodiments, selecting points within the user interface 214 outside of the areas providing pause option 216 and/or forward option 222 may result in user interface 200 being replaced with a different interface. By way of example, if the user were to tap at location 224, the user interface 200 may be replaced with user interface 300 of FIG. 3.

It should be appreciated that, in some embodiments, initiating a screen capture option when user interface 200 is viewable (regardless of whether user interface 214 is displayed) may not initiate providing an item-sharing menu as described below in connection with FIG. 3.

FIG. 3 is an example user interface 300 (e.g., a Now Playing screen), in accordance with at least one embodiment. In some embodiments, the user interface 300 may include one or more images associated with the musical track currently being played. By way of example, image 302 (e.g., an album cover of the album to which "Song S" belongs) may be displayed. In some embodiments, the image 302 may be retrieved from local memory, while in other embodiments, the image 302 may be provided from a service provider computer (e.g., a computing device that is actively streaming song S to the user device on which user interface 300 is displayed).

User interface 300 may include any suitable combination of user interface elements. For example, navigation interface 304 may be provided which indicates a start time 306 and/or end time 308 and element 310. Element 310 can be used to indicate a current play time associated with the portion of the musical track which is currently being played in relation to the whole of the track. In some embodiments, element 310 may be a slider that is selectable and which may be manipulated (e.g., slid to the left or right between the start time 306 and end time 308) to navigate to different portions of the track.

In some embodiments, the user interface 300 may display at 310 the song and/or artist of the song currently being played. In some embodiments, the user interface 300 may include any suitable number of user interface elements that may provide one or more navigational options. For example, as depicted, user interface elements 312 include an option to replay the last played track, pause the currently playing track, or skip to a next track in a queue, although any suitable number and/or combination of navigational options may be presented via user interface 300.

Figure 4:
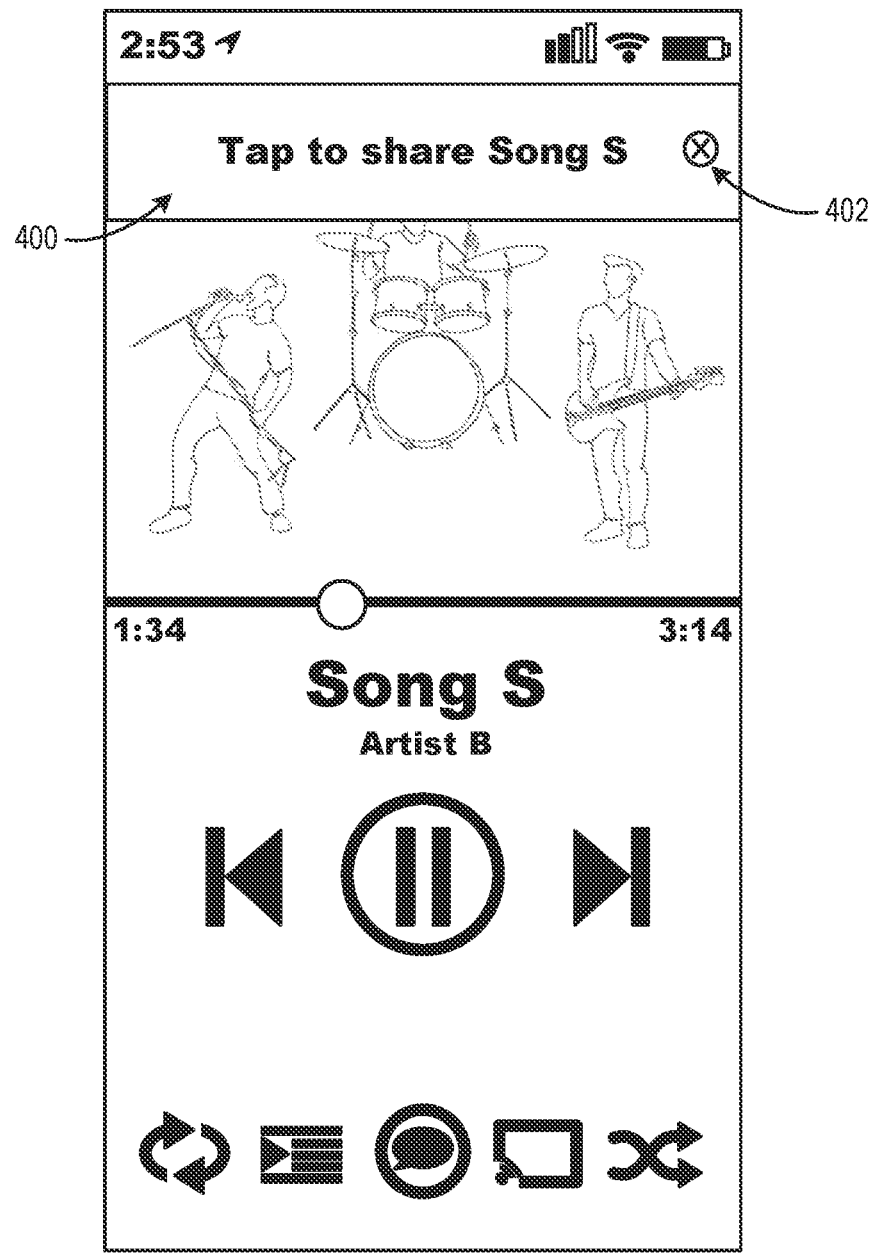
FIG. 4 illustrates an example user interface element provided in response to selection of a user interface action (e.g., initiation/selection of a screen capture option), in accordance with at least one embodiment.

In some embodiments, the user may provide any suitable input associated with a screen capture option while the user interface 300 is being presented at the user device. By way of example, the user may utilize multiple input devices in communication with the user device to initiate the screen capture option (e.g., press multiple buttons of the user's mobile phone, press multiple keys of a keyboard connected to a desktop computer, etc.). In some embodiments, the particular combination of inputs needed to initiate the screen capture option may be device specific, manufacturer specific, operating system specific, and/or user defined. Once the screen capture option is detected (e.g., information indicating the screen capture option is received by the application), the application may update the user interface 300 with additional options. As a non-limiting example, the user interface FIG. 4 illustrates an example user interface element 400 provided in response to selection of a user interface action (e.g., initiation/selection of a screen capture option), in accordance with at least one embodiment. As depicted, user interface element 400 may be overlaid over user interface 300. However, it should be appreciated, that user interface element 400 may be placed in any suitable manner within, atop, or adjacent to the user interface 300. In some embodiments, user interface 300 may be resized to make room for displaying user interface element 400. Although user interface element 400 is depicted as being displayed over the top of user interface 300 and near the top of the display of the user device, it should be appreciated that the user interface element 400 may be situated at any suitable location of the display and/or relative to the user interface 300.

In some embodiments, user interface element 400 may be displayed to verify the user's intent of initiate the screen capture option. By way of example, were the user to tap on the user interface element 400, the user may be presented with the user interface 500 or the user interface 600 of FIGS. 5 and 6, respectively, or another suitable item-sharing menu. It should be appreciated that, in some embodiments, the display of user interface element 400 may be skipped and user interface 500 or user interface 600 may be displayed immediately in response to receiving an indication that the screen capture option was initiated (e.g., via the user interface 300). Although the ongoing example provided contextually relates to sharing a song, it should be appreciated that, in other embodiments, the initiation of the screen sharing option may be associated with other operations (e.g., adding an item to a wish list, adding an item to a play list, adding a calendar event, adding an item to a shopping cart, sharing an album cover, etc.). Thus, the user interface element 400 may be presented with information specific to those operations. For example, in a use case in which initiating the screen capture option is associated with adding an item to a wish list, the user interface element 400, if displayed, may indicate "tap to add this item to you wish list." Said another way, the user interface element 400 may serve as a verification that, if selected, the user verifies his intent is to proceed with the operations indicated by the user interface element 400.

As another non-limiting example, selection of the screen capture option could initiate both a screen capture of an image depicting the content currently displayed at the user device and additional operations. By way of example, a user could take a screen capture of event data (e.g., an advertisement for an event in which they have interest). In some embodiments, an image of the event data as screen captured may be stored in local memory. Additionally, or alternatively, the app from which the screen capture was initiated may analyze the image (or send the image to a server to be analyzed) for event data (e.g., using text recognition algorithm). If event data is detected, the application could execute operations to cause a new calendar event to be generated with the event data and presented to the user for approval. In some embodiments, this may include executing operations that cause another application operating on the device (e.g., a calendar application that maintains calendar events) to generate a calendar event that includes and/or matches the event data identified from the image. If the user approves the event, a calendar event may be added to the user's calendar to subsequently remind the user of the event.

In some embodiments, selection of the user interface element 400 may cause the corresponding operations to be performed (e.g., saving the item to a wish list, adding the item to a shopping cart, saving an album cover to the user's local photo library, etc.) without the need of displaying additional user interfaces (e.g., user interfaces 500 and/or 600). In some embodiments, user interface element 400 may include option 402 that may, when selected, indicate the user does not wish to perform the operations associated with the user interface element 400 (e.g., sharing a song, adding the item to a wish list, adding the item to a playlist, adding the item to a shopping cart, sharing an album cover photo associated with an album to which the item is associated, and the like).

Figure 5:
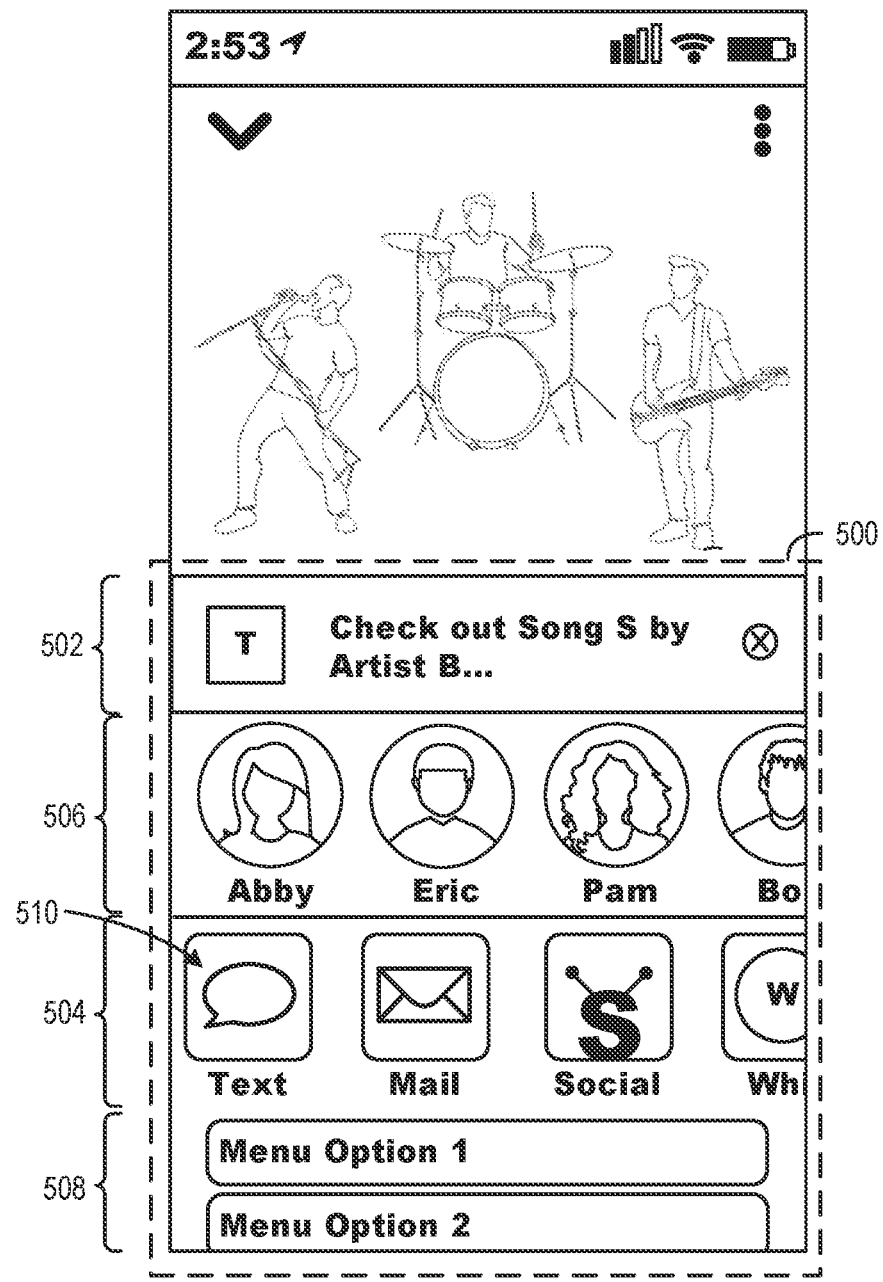
FIG. 5 illustrates an example user interface that may be provided in response to selection of a user interface action, in accordance with at least one embodiment.

FIG. 5 illustrates an example user interface 500 that may be provided in response to selection of a user interface action (e.g., initiation/selection of a screen capture option, selection of the user interface element 300 of FIG. 3, etc.), in accordance with at least one embodiment. In some embodiments, the user interface 500 may be an example of the user interface 114 of FIG. 1. In some embodiments, the user interface 500 may be provided by the operating system of the device on which the user interface 500 is displayed.

As described above, the user interface 500 may be provided in response to detecting a screen capture option initiated at user interface 300 of FIG. 3 (e.g., a Now Playing screen). In other embodiments, the user interface 500 may be provided in response to user input received at the user interface element 400 of FIG. 4.

In some embodiments, user interface 500 may include area 502 for displaying information to be shared. By way of example, the information may include an image associated with the item (e.g., an album cover image), text (e.g., "check out Song S by artist B"), or any suitable attribute associated with the item. Selection of the area 502 may, in some embodiments, navigate the user to a sharing interface such as user interface 700, discussed below in connection with FIG. 7.

As depicted, user interface 500 includes, a number of item-sharing options 504 may be provided. The item-sharing options 116 may be ordered according to a predefined scheme. In some embodiments, a set of recently-utilized contacts 506 may be presented, although in other embodiments, the set may include most-often utilized contacts in addition to or instead of recently-utilized contacts. In some embodiments, any suitable number of additional options 508 may be presented. For example, additional options 508 may include options to store an image associated with the item to local memory, add the item to a wish list, add the item to a shopping cart, or the like. In some embodiments, the user interface 500 may be presented atop and/or adjacent to the user interface 300, although in other embodiments, the user interface 500 may replace the user interface 300 as the focus of the display of the user device. The item-sharing options 504, recently-utilized contact 506 and/or additional options 508 may be utilized in substantially the same manner as item-sharing options 116, recently-utilized contact 118, and/or additional options 120 discussed above in connection with FIG. 1. The functionality will not be repeated here for brevity.

The example depicted in FIG. 5 is related to sharing item information. However, the particular information provided in user interface 500 may differ depending on the operations being associated with the initiation of the screen capture option. By way of example, if the user was viewing an item detail page of an online retailer viewing a particular item offered for consumption, and the screen capture option was selected, the user interface 500 might list the users previously defined wish lists so that the user could select a particular wish list to which the item will be added. Thus, in some embodiments, at least some of the content of the user interface 500 may be requested by the application from a service provider computer (e.g., the service provider computer(s) 810 discussed below in connection with FIG. 8, that are configured to host an online retail website and maintain user profiles that include, among other things, one or more wish lists associated with the user profile). The In some embodiments, such as adding an item to a shopping cart in response to the screen capture option, the application may forgo the display of another user interface (e.g., user interface 500), instead executing operations for adding the item to a shopping cart without prompting the user for additional input.

Figure 6:
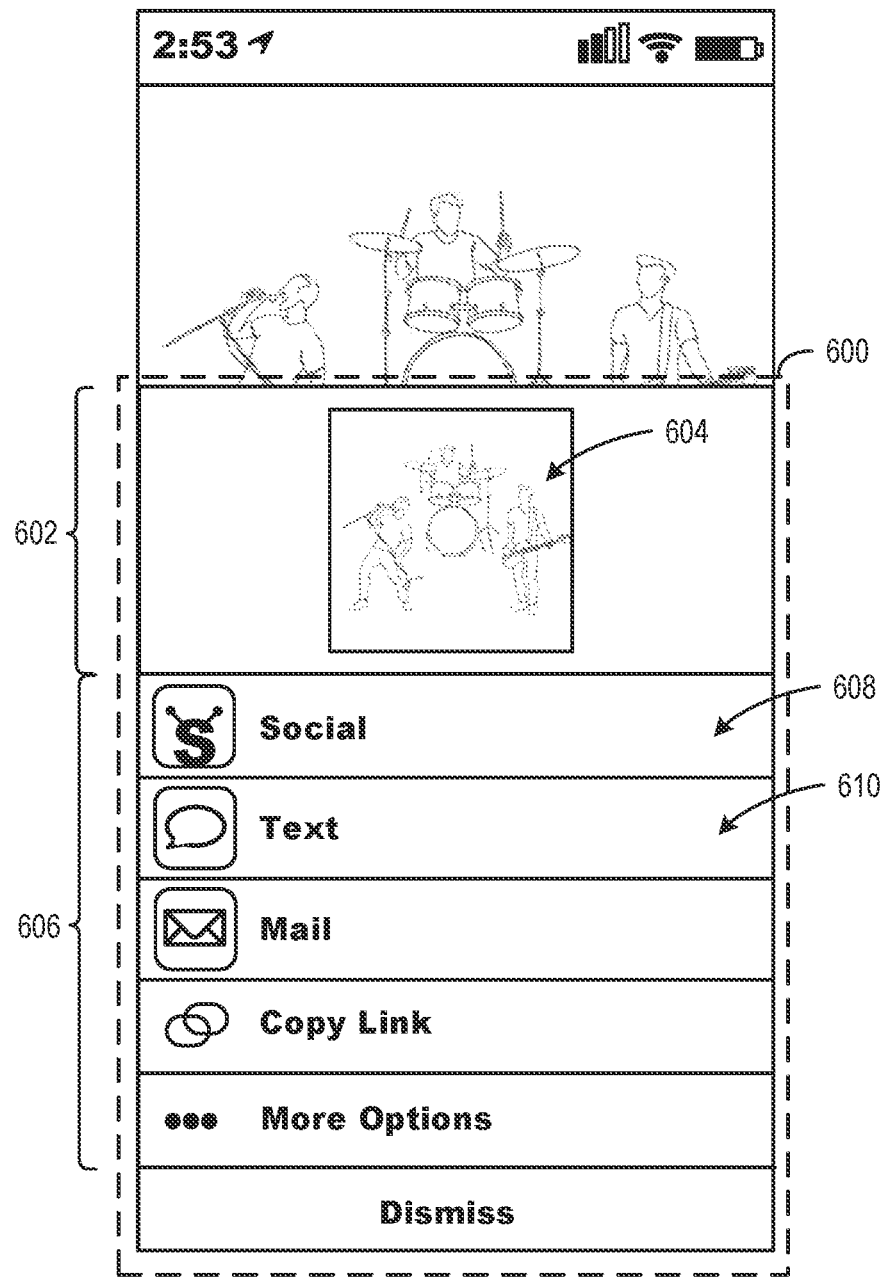
FIG. 6 illustrates another illustrates an example user interface that may be provided in response to selection of a user interface action, in accordance with at least one embodiment.

FIG. 6 illustrates another example user interface 600 that may be provided in response to selection of a user interface action (e.g., initiation/selection of a screen capture option, selection of the user interface element 300 of FIG. 3, etc.), in accordance with at least one embodiment. In some embodiments, the user interface 600 may be provided by the application operating on the user device on which the user interface 300 was displayed.

As described above, the user interface 600 may be provided in response to detecting a screen capture option initiated at user interface 300 of FIG. 3 (e.g., a Now Playing screen). In other embodiments, the user interface 600 may be provided in response to user input received at the user interface element 400 of FIG. 4.

In some embodiments, user interface 600 may include area 602 for displaying information to be shared. By way of example, the information may include an image 604 associated with the item (e.g., an album cover image), text, any suitable attribute of the item, and/or any suitable data associated with the item. Selection of the area 602 may, in some embodiments, navigate the user to a sharing interface such as user interface 700, discussed below in connection with FIG. 7. In some embodiments, the particular information to be shared and/or the format of the information to be shared may be identified, at least in part, based on a selection of the user of one of item-sharing options 606.

As depicted, user interface 600 includes one or more options (e.g., item-sharing options 606) that are selectable by the user. In some embodiments, the particular options provided via the item-sharing options 606 may be customized. By way of example, the item-sharing options 606 may be ordered according to historical use (e.g., historical use of item-sharing options by this user, or by other users of a service corresponding to the application). By way of example, if a user most often shares information via a social media platform, then item-sharing option 608 (e.g., an option for sharing via that social media platform) may be provided first (e.g., at the top) in the item-sharing options 606. If the user often shares information via text (e.g., more often than other means of sharing, but less often then he shares information via the social media platform) then item-sharing option 610 (e.g., an option for sharing item information via text) may be presented below. The particular number of options presented in item-sharing options 606, and the order of these options may vary depending on the user and/or their historical usage of such options and/or preference data indicating a preference and/or order of these options.

The example depicted in FIG. 6 is related to sharing item information. However, the particular information provided in user interface 600 may differ depending on the operations being associated with the initiation of the screen capture option. By way of example, if the user was viewing an item detail page of an online retailer viewing a particular item offered for consumption, and the screen capture option was selected, the user interface 600 might list the users previously-defined wish lists so that the user could select a particular wish list to which the item will be added. In some embodiments, the list of wish lists may be ordered according to historical behavior indicating how often the user adds items to each wish list. In some embodiments, at least some of the content of the user interface 600 may be requested by the application from a service provider computer (e.g., the service provider computer(s) 810 discussed below in connection with FIG. 8, that are configured to host an online retail website and maintain user profiles that include, among other things, one or more wish lists associated with the user profile). Additionally, the application may request historical data from the service provider computer in order to determine an ordering for the options provided via user interface 600.

Figure 7:
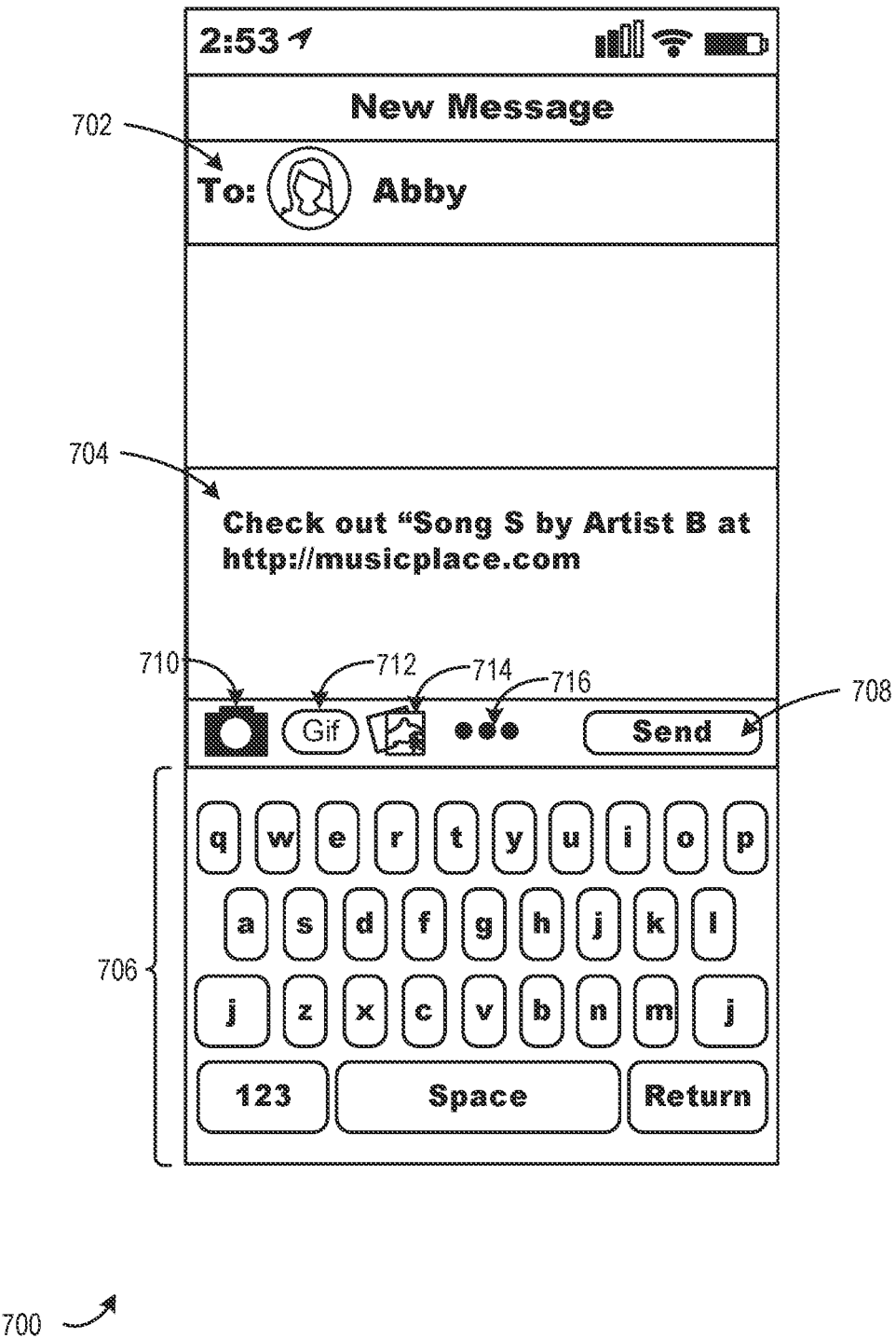
FIG. 7 illustrates example user interface elements provided in response to user input, in accordance with at least one embodiment.

FIG. 7 illustrates an example user interface 700 provided in response to user input, in accordance with at least one embodiment. By way of example, user interface 700 may be presented in response to initiation of a screen capture option at user interface 300 directly, or the user interface 700 may be presented in response to user input indicating selection of the item-sharing option 510 of FIG. 5 or the item-sharing option 610 of FIG. 6.

In some embodiments, the user interface 700 may be provided by an operating system of the user device and/or some aspects of the user interface 700 may be provided by the application from which the item-sharing option was selected that resulted in the display of the user interface 700. The user interface 700 may, in some embodiments, be provided by a different application from the one that was used to select the item-sharing option that resulted in the display of user interface 700.

In some embodiments, the user interface 700 may include field 702. Field 702 may be prepopulated with an identifier associated with an intended recipient (or more than one intended recipient) based at least in part on a selection of the recently-utilized contacts 506, selection of an item-sharing option of FIG. 6, or the field 702 may be manually populated by the user.

In some embodiments, the information provided at 704 may be the same displayed in area 502 of FIG. 5 or at area 602 of FIG. 6, or the information provided at 704 may differ. If the information is the same as that displayed at area 502 or 602, the information displayed at area 502 and/or 602 may be formatted and/or arranged differently from the information provided at 704.

In some embodiments, a user interface 706 may be provided, enabling the user to modify and/or customize the data being shared. By way of example, the user may modify the text provided at 704 to customize their text message in any manner they see fit. In some embodiments, selection of option 708 may cause a text message including the information provided at 704 to be transmitted to the recipient(s) identified in field 702.

In some embodiments, the user may further customize the data being shared prior to transmission. By way of example, in some embodiments, additional user interface elements including, but not limited to, any suitable combination of user interface elements 710-716 may be provided to offer additional customization options. For instance, user interface element 710, when selected, may cause the user to be presented with additional interfaces for capturing an image or video which may be shared with (or instead of) the information provided at 704. User interface element 712, when selected, may cause the user to be presented with one or more interfaces/options to select an animated image from a corpus of previously defined animated images (e.g., gifs). As yet another example, user interface element 714, when selected, may cause the user to be presented with one or more options to select and share a previously-captured image and/or video (e.g., selected from the user's in-memory photo and/or video library). It should be appreciated that the examples above are intended for illustrative purposes and the number and/or type of additional user interface elements actually provided may vary. In some embodiments, the specific user interface elements provided may depend on the application and/or the item. In some embodiments, when additional options might be available, user interface element 716 may be presented. When selected, the user may be presented a menu with still more additional customization options. As with the menus of FIGS. 5 and 6, in some embodiments, the user interface elements 710-716 (and/or the options provided after selecting the user interface element 716) may be ordered based at least in part on historical behavior of the user (and/or historical behavior associated with other users of the system) indicating which elements are more likely to be selected than others. Thus, in some embodiments, the particular elements presented and the order by which these elements are presented may be based, at least in part, on which are most likely to be selected.

It should be appreciated that, in some embodiments, the user is returned to user interface 300 (e.g., the interface from which the screen capture option was initiated) after execution of the operations associated with the screen capture option are performed. In the item-sharing example, the user may be returned to user interface 300 once the user selects option 708 (or potentially when the item information is transmitted in response to selection of option 708). Although not depicted, in some embodiments, when the user is sent back to the original user interface from which the screen capture option was initiated (e.g., user interface 300), a number of recommendations may be presented of additional content to share. In some embodiments, these recommendations may be personalized to the user. By way of example, the particular recommendations can be based on the user's preferences, or popular content among other users who have similar references as this user. In some embodiments, these recommendation may be identified and/or requested from the service provider computer(s) hosting the application or by the application itself. In some examples, the recommendations may be identified utilizing historical data associated with the user (e.g., past-purchase history, website navigation history, previously shared content, etc.) and/or user profile information indicating aspects about the user. In some embodiments, any suitable portion of this data may be provided as input to a machine-learning model that has been previously trained (e.g., utilizing supervised learning techniques) to identify recommendations based on such input data. The recommendations identified may be displayed in any suitable manner at user interface 300 of FIG. 3. Selecting one of these recommendations may initiate the functionality discussed above in connection with the user interfaces discussed in connection with FIGS. 4-7. In some embodiments, selecting one of these recommendation may not cause playback to be altered at the user device. For example, if the user shares song S while song S is playing and upon completing this sharing, selects another song to share from a set of recommended sharable content, song S may continue to play while the user submits user input via any suitable combination of the user interfaces of FIGS. 4-7.

Figure 8:
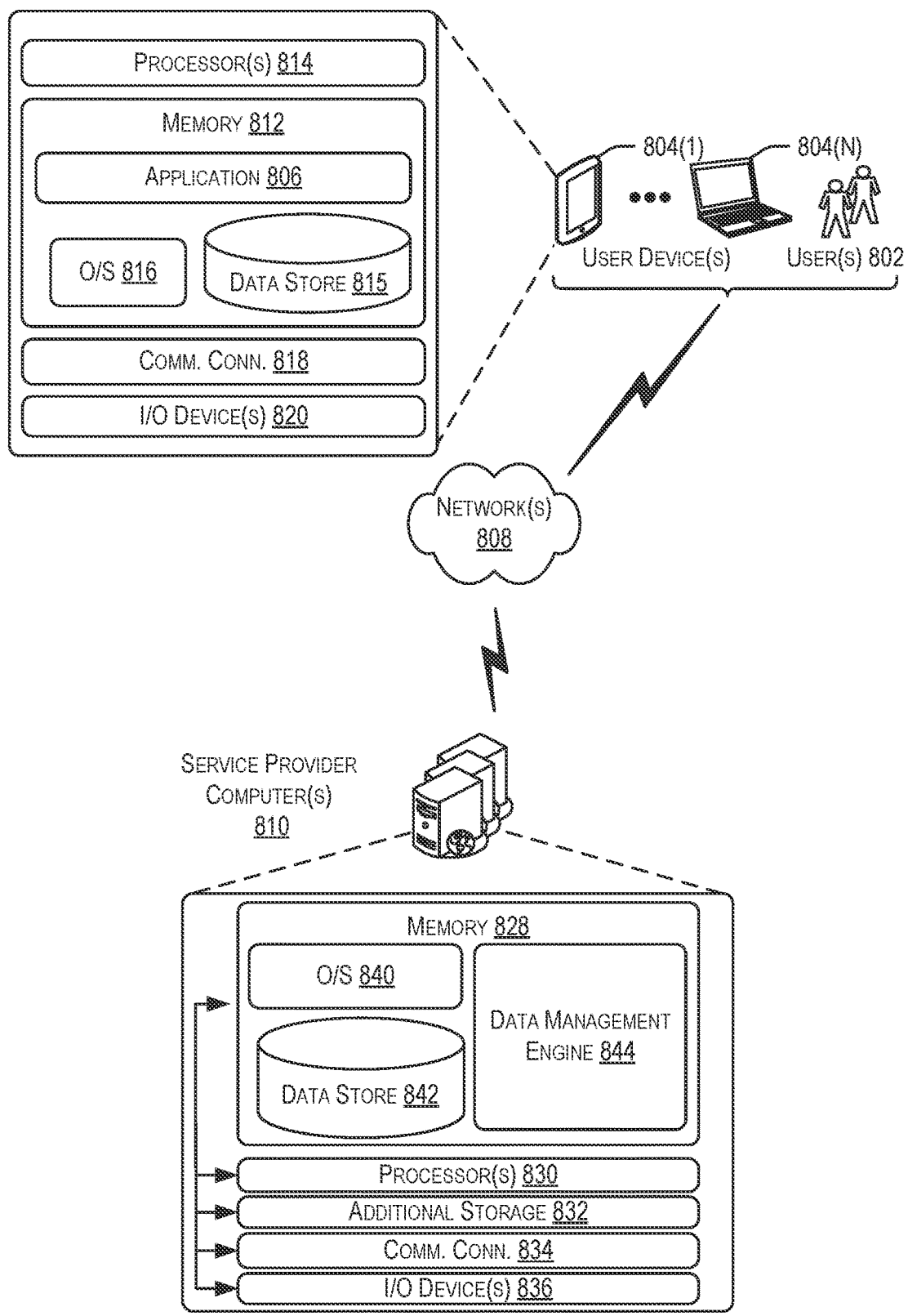
FIG. 8 illustrates components of a system, in accordance with at least one embodiment.

FIG. 8 illustrates components of a system 800, in accordance with at least one embodiment. In system 800, one or more user(s) 802 may utilize a user device (e.g., a user device of a collection of user device(s) 804 to access a user interface accessible through an application 806 running on the user device(s) 804 via one or more network(s) 808. In some aspects, the application 806 operating on the user device(s) 804 may be hosted, managed, and/or provided by a computing resources service or service provider, such as by utilizing one or more service provider computer(s) 810.

In some examples, the network(s) 808 may include any one or a combination of many different types of networks, such as cable networks, the Internet, wireless networks, cellular networks, and other private and/or public networks. While the illustrated example represents the user(s) 802 accessing application functionality over the network(s) 808, the described techniques may equally apply in instances where the user(s) 802 interact with the service provider computer(s) 810 via the one or more user device(s) 804 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the data management engine 844, discussed further below in more detail, may operate in whole or in part on the user device(s) 804. Thus, in some embodiments, the user(s) 802 may access the functionality of the data management engine 844 directly through the user device(s) 804 and/or the service provider computer(s) 810 via user interfaces provided by the data management engine 844. In some embodiments, the data management engine 844 may host an online retail website and/or provide content management services such as music and/or video streaming services.

The service provider computer(s) 810, perhaps arranged in a cluster of servers or as a server farm, may host the application 806 operating on the user device(s) 804 and/or cloud-based software services. Other server architectures may also be used to host the application 806 and/or cloud-based software services. The application 806 operating on the user device(s) 804 may be capable of handling requests from the user(s) 802 and serving, in response, various user interfaces that can be rendered at the user device(s) 804. The application 806 operating on the user device(s) 804 can present any suitable type of website that supports user interaction. The described techniques can similarly be implemented outside of the application 806, such as with other applications running on the user device(s) 804.

As a non-limiting example, the data management engine 844 may be configured to host an online retail website, a data streaming service, and the like. The application 806 may transmit and receive data to/from the service provider computer(s) 810 utilizing any suitable interfaces (e.g., application programming interfaces). Thus, options selected via the application may result in data (e.g., webpage data, user profile information associated with one or more users (e.g., the user), audio/video stream data, etc.) to be transmitted between the application 806 and the service provider computer(s) 810 (e.g., in one direction, in either direction, etc.) according to a predefined communications protocol.

The user device(s) 804 may be any suitable type of computing device such as, but not limited to, a mobile phone, a hand-held scanner, a touch screen device, a smart-phone, a personal digital assistant (PDA), a laptop computer, a desktop computer, a thin-client device, a tablet PC, an electronic book (e-book) reader, etc. In some examples, the user device(s) 804 may be in communication with the service provider computer(s) 810 via the network(s) 808, or via other network connections.

In one illustrative configuration, the user device(s) 804 may include at least one memory 812 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user computing device, the memory 812 may be volatile (such as random access memory (RAM)) and/or non-volatile (such as read-only memory (ROM), flash memory, etc.). The user device(s) 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 812 may include multiple different types of memory, such as static random access memory (SRAM), dynamic random access memory (DRAM), or ROM.

Turning to the contents of the memory 812 in more detail, the memory 812 may include an operating system 816, one or more data stores 815, and one or more application programs, modules, or services provided via the application 806 (e.g., a web browser application, a shopping application associated with an online retailer, a music and/or video streaming application, etc.). The application 806 may be configured to receive, store, and/or display a network page or other interfaces for interacting with the service provider computer(s) 810. The application 806 may include any suitable functionality related to code translations and/or any suitable functionality provided by the service provider computer(s) 810. Additionally, the memory 812 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 804 may also contain communications connection(s) 818 that allow the user device(s) 804 to communicate with a stored database, another computing device or server (e.g., the service provider computer(s) 810), user terminals and/or other devices on the network(s) 808. The user device(s) 804 may also include I/O device(s) 820, such as a keyboard, a mouse, a pen, a voice input device, a touch input device, a display, speakers, a printer, etc.

In some aspects, the service provider computer(s) 810 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 810 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 810 may be in communication with the user device(s) 804 and/or other service providers via the network(s) 808 or via other network connections. The service provider computer(s) 810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 810 may include at least one memory 828 and one or more processing units (or processor(s)) 830. The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computer(s) 810, the memory 828 may be volatile (such as RAM) and/or non-volatile (such as ROM, flash memory, etc.). The service provider computer(s) 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computer(s) 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 810 may also contain communications connection(s) 834 that allow the service provider computer(s) 810 to communicate with a stored database, another computing device or server, user terminals and/or other devices on the network(s) 808. The service provider computer(s) 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, one or more data stores 842, and/or one or more application programs, modules, or services for implementing the features disclosed herein, such as the features provided by the data management engine 844. The application 806 and/or the data management engine 844 may be configured to perform any suitable combination of the operations as described above in connection with the examples provided in FIGS. 1-7.

Figure 9:
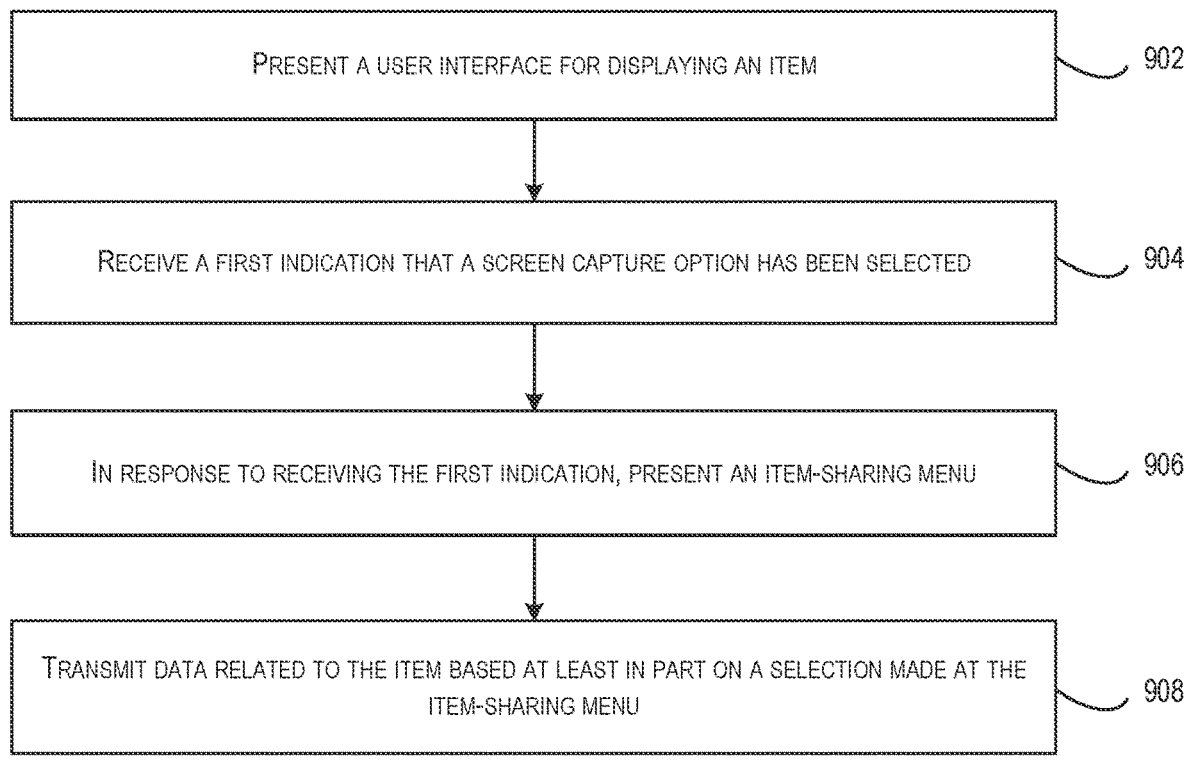
FIG. 9 is a flowchart illustrating an example method for sharing data from a user interface, in accordance with at least one embodiment.

FIG. 9 is a flowchart illustrating an example method 900 for sharing data from a user interface, in accordance with at least one embodiment. A computer-readable medium may store computer-executable instructions that, when executed by at least one processor, cause at least one computer to perform instructions comprising the operations of the method 900. It should be appreciated that the operations of the method 900 may be performed in any suitable, not necessarily the order depicted in FIG. 9. Further, the method 900 may include additional, or fewer operations than those depicted in FIG. 9. The operations of method 900 may be performed by the application (e.g., the application 806 of FIG. 8) which may operate in whole or in part on a user device (e.g., one or more of the user device(s) 804 of FIG. 8) and/or the service provider computer(s) 810 of FIG. 8.

The method 900 may begin at 902, where a user interface (e.g., user interface 300) for displaying an item (e.g., a song via a Now Playing screen) may be presented (e.g., at a user device such as user device 104 of FIG. 1). Although user interface 300 is used for illustrative purposes, any user interface 300 configured to display item information may be utilized. As another non-limiting example, the user interface may be an item detail page of an online retail website where item information may be presented.

At 904, a first indication that a screen capture option has been selected can be received (e.g., via an application that had primary display focus when the screen capture option was initiated). In some embodiments, the first indication may include detecting that a particular combination of input devices were utilized in a predefined manner (e.g., a predefined combination of buttons and/or keys were used to initiate a screen shot). In some embodiments, detecting this condition may include receiving an indication of the condition from an operating system of the user device.

At 906, an item-sharing menu (e.g., user interface 500 and/or user interface 600 of FIGS. 5 and 6, respectively) may be presented. In some embodiments, the item-sharing menu may be presented in response to receiving the first indication that the screen capture option has been selected.

As described above in connection with FIGS. 1-7, in some embodiments, a different menu (different from the item-sharing menu) may be presented when the screen capture option is associated with actions other than item sharing.

At 908, data related to the item may be transmitted based at least in part on a selection made at the item-sharing menu. By way of example, a hyperlink may be included in the data related to the item. The hyperlink, if selected, may cause the device with which the hyperlink was selected to be redirected to a webpage associated with the hyperlink.

Figure 10:
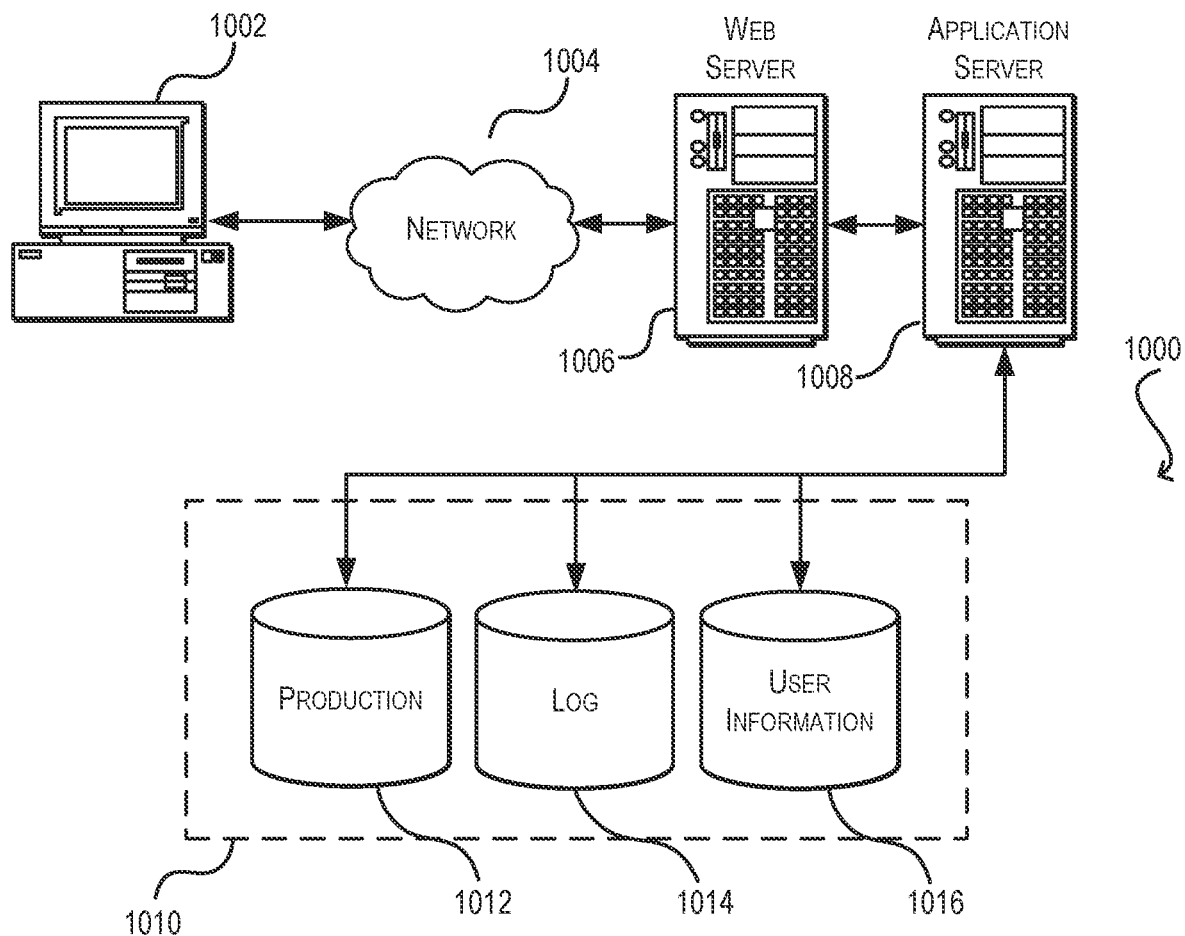
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

presenting, by a computing device, a first user interface for displaying a selected item;

receiving, by the computing device, user input while a first application has primary display focus, the user input indicating a first selection of a screen capture option, the screen capture option being associated with capturing an image of data displayed at the computing device using a device-specific or manufacturer-specific combination of one or more user inputs;

at least in response to the first selection of the screen capture option and identifying that the first user interface was presented by the first application when the user input was initiated, presenting, in the first user interface, an item sharing option;

receiving, by the computing device, second information that identifies a second selection of the item sharing option;

at least in response to receiving the second selection of the item sharing option, presenting, a sharing interface for sending a message that includes sharing information about the selected item to a second device;

receiving, by the computing device, subsequent user input while the first application has primary display focus, the subsequent user input indicating a third selection of the screen capture option; and in response to the third selection of the screen capture option and identifying that a second user interface was presented by the first application when the subsequent user input was initiated, storing the image of data displayed at the computing device and forgoing presentation of the item sharing option.

2. The computer-implemented method of claim 1, wherein the sharing information comprises at least one: of a link to access the selected item, a title of the selected item, an artist or vendor associated with the selected item, or an image that includes at least part of a screen capture corresponding to the screen capture option.

3. The computer-implemented method of claim 1, wherein the sharing interface is presented at least in response to an instruction sent to an operating system of the computing device, the instruction identifying the sharing information.

4. The computer-implemented method of claim 3, wherein the sharing interface is received from the operating system.

5. The computer-implemented method of claim 1, wherein the selected item is an audio file, and wherein the first user interface is a "Now Playing" interface.

6. The computer-implemented method of claim 1, wherein the selected item is available on a merchant website or application, and wherein the first user interface is an item detail page.

7. The computer-implemented method of claim 1, wherein presenting the item sharing option in the first user interface is based at least in part on determining that the selected item depicted at the first user interface is of a first type, and wherein storing the image of data displayed at the computing device is further based at least in part on identifying that the second user interface depicts a second item of a second type that is different from the first type.

8. The computer-implemented method of claim 1, further comprising:
   receiving, by the computing device, additional user input while a second application has primary display focus, the additional user input indicating a fourth selection of the screen capture option;
   at least in response to receiving the third selection of the screen capture option and identifying that the second application has primary display focus, executing a third set of operations that differ from presenting the item sharing option.

9. A computing device, comprising:
   a memory comprising computer-executable instructions; and
   one or more processors in communication with the memory and configured to access the memory and execute the computer-executable instructions to cause the computing device to perform operations comprising:
      presenting a first user interface for displaying an item;
      receiving, by the computing device, a first indication that a screen capture option has been selected while the first user interface is being presented, the screen capture option being associated with capturing an image of data displayed at the computing device using a device-specific or manufacturer-specific combination of one or more user inputs;
      in response to receiving the first indication that the screen capture option was selected while the first user interface was being presented, executing a first set of operations;
      receiving, by the computing device, a second indication that the screen capture option was selected while a second user interface was being presented; and
      in response to receiving the second indication that the screen capture option was selected while the second user interface was being presented, executing a second set of operations that differ from the first set of operations.

10. The computing device of claim 9, wherein executing the first set of operations comprises presenting an item-sharing menu, the item-sharing menu having a plurality of item sharing options, and wherein the item sharing options are ordered based at least in part on historical data associated with a user of the computing device.

11. The computing device of claim 9, wherein executing the first set of operations comprises presenting an item-sharing menu, the item-sharing menu having a plurality of item sharing options, and wherein the item sharing options are ordered based at least in part on historical data corresponding to a plurality of users of a service provider.

12. The computing device of claim 9, wherein the operations further comprise receiving item detail information from a service provider computer associated with a service provider, wherein the item detail information is displayed with the item at the first user interface.

13. One or more computer-readable storage medium comprising computer-executable instructions that, when executed by one or more processors, cause a computing device to perform operations comprising:
   presenting a first user interface depicting an item;
   receiving a first indication that a screen capture option was selected while the first user interface was being presented, the screen capture option being associated with capturing an image of data displayed at the computing device using a device-specific or manufacturer-specific combination of one or more user inputs;
   in response to receiving the first indication that the screen capture option was selected while the first user interface was being presented, executing a first set of operations comprising presenting a second user interface adjacent to the first user interface;
   receiving user input at the second user interface;
   executing one or more operations related to the item based at least in part on the user input received at the second user interface;
   receiving a second indication that the screen capture option was selected while a third user interface was being presented; and
   in response to receiving the second indication that the screen capture option was selected while the third user interface was being presented, executing a second set of operations that differ from the first set of operations.

14. The one or more computer-readable storage medium of claim 13, wherein the first user interface is presented at a social media webpage, wherein the second user interface is associated with posting information at the social media webpage, and wherein executing the one or more operations comprises posting information at the social media webpage.

15. The one or more computer-readable storage medium of claim 13, wherein executing the one or more operations comprises adding the item to a playlist.

16. The one or more computer-readable storage medium of claim 13, wherein executing the one or more operations comprises storing an image of the item that is different from content currently being displayed at the first user interface when the screen capture option was selected.

17. The one or more computer-readable storage medium of claim 13, wherein executing the one or more operations comprise adding the item to a wish list associated with a user.

18. The one or more computer-readable storage medium of claim 13, wherein the item is associated with a musical album, wherein the second user interface displays an image associated with the musical album, and wherein executing the one or more operations comprises storing the image associated with the musical album in local memory.

19. The one or more computer-readable storage medium of claim 13, wherein the item is an event, and wherein the one or more operations further comprise:
- identifying, from the image of data displayed at the computing device, event data corresponding to the event;
- generating a calendar event using the event data corresponding to the event, wherein the second user interface presents the calendar event; and
- storing the calendar event in local memory.

20. The one or more computer-readable storage medium of claim 13, wherein the one or more operations are identified based at least in part on a type of application presenting the first user interface and the second user interface and the item.

* * * * *